United States Patent [19]

Wössner

[11] Patent Number: 4,768,629
[45] Date of Patent: Sep. 6, 1988

[54] DOUBLE-TUBE VIBRATION DAMPER

[75] Inventor: Felix Wössner, Schweinfurt, Fed. Rep. of Germany

[73] Assignee: Fichtel & Sachs AG, Schweinfurt, Fed. Rep. of Germany

[21] Appl. No.: 909,124

[22] Filed: Sep. 18, 1986

[30] Foreign Application Priority Data

Sep. 19, 1985 [DE] Fed. Rep. of Germany ....... 3533387

[51] Int. Cl.⁴ .......................... F16F 9/48; F16F 9/34; F16F 11/00; F16F 9/00
[52] U.S. Cl. .................................. 188/284; 188/271; 188/322.14; 188/322.22
[58] Field of Search ............... 188/271, 284, 285, 311, 188/315, 316, 266, 381, 288, 322.14, 322.22, 322.19, 322.15; 192/57; 92/169, 172, 181 P, 183; 267/8 R, 9 C, 34, 64.15, 124, 195, 202, 214, 221

[56] References Cited

U.S. PATENT DOCUMENTS

| 2,395,027 | 2/1946 | Whisler | 188/284 |
| 2,705,634 | 4/1955 | Sampson et al. | 267/9 C |
| 2,729,308 | 1/1956 | Koski et al. | 188/284 |
| 2,742,112 | 4/1956 | Wessel | 188/284 |
| 4,383,595 | 5/1983 | Schnitzius | 188/316 X |
| 4,502,366 | 3/1985 | Metz et al. | 188/316 X |

FOREIGN PATENT DOCUMENTS

| 1069956 | 11/1959 | Fed. Rep. of Germany . |
| 1226833 | 10/1966 | Fed. Rep. of Germany . |
| 585402 | 2/1947 | United Kingdom . |
| 596759 | 1/1948 | United Kingdom . |
| 683198 | 11/1952 | United Kingdom . |
| 753092 | 7/1956 | United Kingdom . |
| 941761 | 11/1963 | United Kingdom . |
| 1411219 | 10/1975 | United Kingdom . |

Primary Examiner—Andres Kashnikow
Assistant Examiner—Robert J. Oberleitner
Attorney, Agent, or Firm—Toren, McGeady & Associates

[57] ABSTRACT

In a double-tube vibration damper the piston acts on an abutment spring when arriving at a predetermined position during its inward stroke. The abutment spring acts on a control member. The control member cooperates with a bottom passage to reduce the cross-sectional area of the bottom passage in response to the piston starting to act onto the abutment spring such as to reduce the cross-sectional area of the bottom passage. In this way a hydraulic abutment function is obtained on inward movement of the piston rod. The control member is biased by a return spring towards the abutment spring. The abutment spring acts with its end remote from the control member onto a friction ring, which friction ring is frictionally guided by the inner face of the cylinder. The biasing action of the return spring is larger than the force necessary for moving the friction ring along the inner face of the cylinder.

14 Claims, 6 Drawing Sheets

DOUBLE-TUBE VIBRATION DAMPER

BACKGROUND OF THE INVENTION

Double-tube vibration dampers are frequently used in motor vehicles within the wheel suspension system. It is desirable to avoid mechanical abutment of components at the end of the inward stroke of the piston rod member with respect to the cylinder. Therefore, so-called hydraulic abutment is used for avoiding such mechanical abutment of components.

This invention relates to an improvement of a hydraulic abutment.

STATEMENT OF THE PRIOR ART

Known from DE-AS No. 1,069,956 is a double-tube vibration damper with hydraulic pressure abutment in which an abutment plate co-operating with the bottom valve is connected via an abutment spring fixed in the piston and, with the effect from a predetermined retraction distance of the piston rod, comes to bear on an abutment face formed by the bottom valve. This known pressure abutment requires considerable space and a specific design of the bottom valve body. The abutment plate itself, due to the multiplicity of parts connected with it, has the disadvantage of being of considerable weight and, while it is not resting on the bottom valve, and due to the free suspension from the abutment spring, forms a spring mass system which is energized by transverse accelerations and so strikes the cylinder tube and causes noise. Similarly, noises occur if the relatively heavy abutment strikes the abutment surface of the bottom valve upon rapid inwards movements of the piston rod. Also problematical is the assembly since it must be ensured that when the abutment spring is fixed on the piston and on the abutment plate, the predetermined axial location of the abutment plate is respected.

An arrangement for controlling the damping of the hydraulic double-tube vibration damper which is dependent upon the amount by which the piston rod is retracted is known from DE-AS No. 1,226,833. To this end, a control pin is used which co-operates with two springs and a bore. This construction likewise has considerable overall length and constitutes a spring mass system which can start to vibrate naturally and so perform uncontrolled movements which adversely affect the damping control and give rise to abutment noises. Since this control pin is subject not only to the spring forces but also to the flow forces which act in an axial direction, there is the danger that with very rapid inwards movements of the piston rod, the control pin may suddenly be drawn by flow forces into the bore cooperating with it so that the damping forces rise abruptly.

A further disadvantage of the two previously mentioned constructions lies in the fact that the hydraulic pressure abutment forces are generated only by throttling at the bottom valve. In consequence, very high pressures occur in the working space beneath the piston at the required pressure abutment damping which is usually relatively high.

OBJECT OF THE INVENTION

It is the object of the present invention to provide a hydraulic pressure abutment for a double-tube vibration damper which avoids the disadvantages of the known constructions, is simple in design, offers high functional reliability while being of short overall length and which, at least in normal operation, does not give rise to substantial noise and yet permits of problem-free assembly.

SUMMARY OF THE INVENTION

A double-tube vibration damper comprises a cylinder having an axis and two ends, namely a first end and a second end and defining a cavity axially between said two ends. A container coaxially surrounds the cylinder and has a first end and a second end, respectively, adjacent said first and said second end, respectively, of said cylinder. A piston rod guiding and sealing unit is provided adjacent said first ends. A bottom valve unit is provided adjacent said second ends. A compensation volume is defined radially between the cylinder and the container. A piston rod member extends through the piston rod guiding and sealing unit and is axially movable inwards and outwards of the cavity. A piston unit is provided on said piston rod member within said cavity and separates said cavity into two working chambers, a first working chamber adjacent the first ends and a second working chamber adjacent the second ends. The working chambers contain a body of liquid. The compensation volume contains a body of liquid and a body of gas. The piston unit is crossed by piston passage means permitting liquid flow between the first working chamber and the second working chamber in response to axial movement of the piston rod member. The bottom valve unit comprises bottom passage means permitting liquid flow between the second working chamber and the compensation volume in response to axial movement of the piston rod member. An axially movable control unit co-operates with the bottom passage means. An abutment spring is acted upon at one of its ends by one of the piston unit and the piston rod member in response to a predetermined path of inwards movement of the piston rod member. The other end of the abutment spring acts upon the control unit such as to reduce the cross-sectional area of the bottom passage means in response to one of the piston unit and the piston rod member starting action onto the abutment spring.

The control unit is axially movable between a first axial position defined by first abutment means and increasing the cross-sectional area of the bottom passage means, and a second axial position defined by second abutment means and reducing the cross-sectional area of the bottom passage means. The control unit is biased by return spring means towards the first axial position. The abutment spring acts with said one end onto a friction ring frictionally guided by an inner face of the cylinder. The return spring means have a spring force exceeding the force necessary for axially moving the friction ring with respect to the inner face.

Thus, the pressure abutment is simple in construction and has only a short axial overall length. As a result of the friction ring being guided with friction in the cylinder, the abutment spring is never entirely relieved, so that there can be no disturbing noises in normal operation, i.e. when the pressure abutment is not being actuated. By reason of the dimensioning of the return spring, it is ensured that in normal operation, despite minimal initial tension in the abutment spring, the hydraulic pressure abutment will be ineffectual. Also when a part of the piston-piston rod-sub-assembly is acting on the friction ring, then due to the low mass, the abutment noises, even at high piston rod retraction velocities, will be scarcely perceptible. With regard to assembly, no difficulties arise since the bottom valve unit is substantially retained in usual design and a non-return valve associated with the outward movements remains fully functional.

In a further development of the invention, an abutment plate unit cooperates with the friction ring and a component fixed to said piston rod member such as to reduce the cross-sectional area of the piston passage means in response to the component acting onto the one end of the abutment spring. Consequently, it is made easily possible to generate the required pressure abutment damping both through the bottom valve unit and also through the piston unit.

No changes in a usual bottom valve unit are required if the control unit co-operates with a preliminary valve body comprising throughflow ports and disposed in series with the bottom valve.

Perfect functioning of the bottom valve associated with the outward movement or traction stage is provided in that the control unit is provided with a non-return valve which opens on ouward movement, i.e. in the traction stage.

An embodiment of the hydraulic pressure abutment which is particularly straightforward to assemble is obtained in that, according to a further feature of the invention, the abutment spring is connected to both the control unit and the abutment plate unit. In consequence, the entire arrangement which constitutes the pressure abutment can be produced as a component unit outside the vibration damper.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to embodiments shown in the accompanying drawings, in which.

DESCRIPTION OF THE PREFERRED EMBODIMENTS

Figure 1:
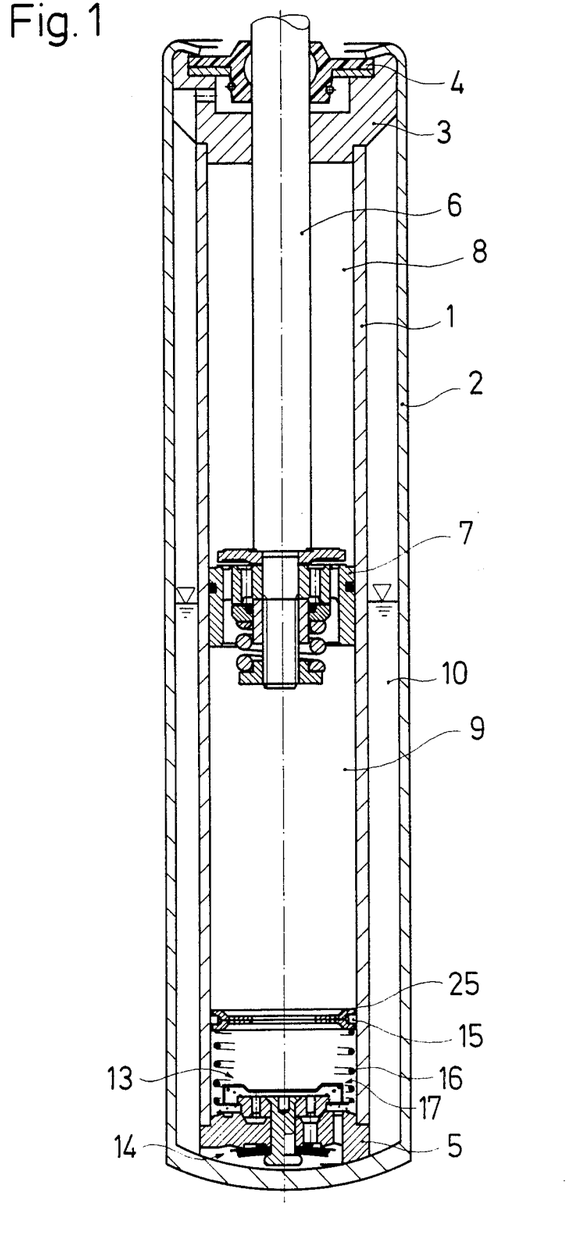
FIG. 1 is a longitudinal section through a double-tube vibration damper.

The double-tube vibration damper shown in FIG. 1 comprises a cylinder 1 clamped concentrically in a container 2 by means of a piston rod guide 3 and a bottom valve 5. A piston rod 6 guided in the piston rod guide 3 and sealed outwardly by a piston rod gasket 4 is connected rigidly to a piston 7 guided for axial movement in the cylinder 1. The interior of the cylinder 1, filled with damping liquid, is sub-divided by the piston 7 into the upper working space 8 and the lower working space 9, these two working spaces 8 and 9 being connected to each other by an outward movement piston passage 11a with an associated valve 11 for the outward movement or traction stage and an inward movement piston passage 12a associated with a valve 12 which operates during the inward movement or compression stage. A compensating space 10 bounded by the outer wall of the cylinder 1 and the inner wall of the container 2 is filled with damping liquid and gas and communicates with the working space 9 via the bottom valve unit 5 which comprises an outward movement bottom passage 13a with a valve 13 for the outward movement or traction stage and an inward movement bottom passage 14a with a valve 14 for the inward movement or compression stage.

Figure 2:
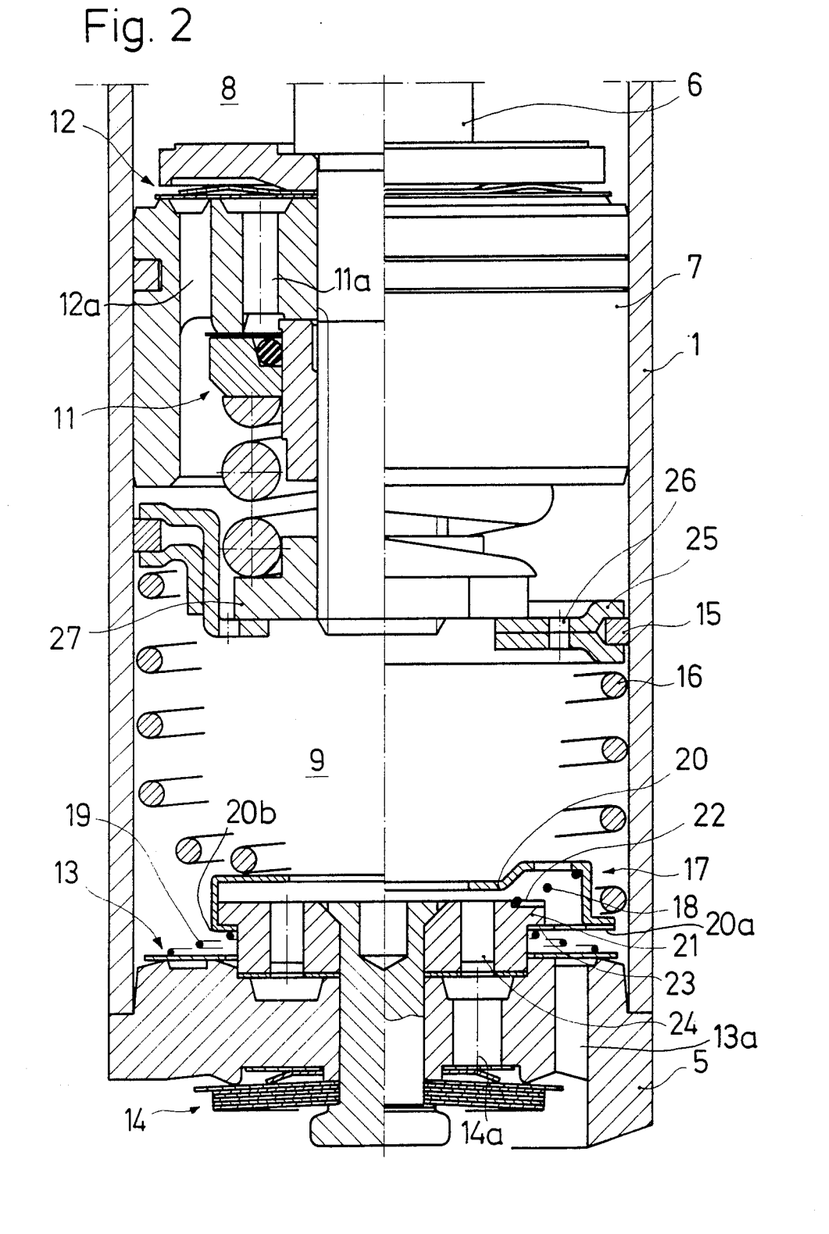
FIG. 2 is an enlarged view of the hydraulic pressure abutment according to FIG. 1.

A pressure abutment which operates with effect from a predetermined amount by which the piston rod 6 is moved inwards is shown in FIGS. 1 and 2. This pressure abutment consists essentially of a ring 15 guided frictionally on the inside wall of the cylinder 1 and which is in operative connection with an abutment spring 16, this abutment spring 16 being supported on a control member 17. This control member 17 is subject to the action of a return spring 18 which acts in opposition to the abutment spring 16 and is guided by a collar 21 on a part rigidly connected to the bottom valve unit 5 so as to allow axial movement between the abutments 22 and 23. In the right-hand half of FIG. 2 is shown the control member 17 which forms a valve plate 20 and which consists of two sheet metal parts 20 and 20a while the left-hand half of this control member consists of a cup-shaped component which has an inwardly directed flange 20b which bears on the abutment 23 when the pressure abutment is inoperative. A valve spring 19 associated with the valve 13 is provided on this left-hand side as a return spring, while on the right-hand side this valve spring 19 assists the return spring 18. Cooperating with an adjusting nut 27 which serves to vary the initial tension of the valve spring of the damping valve 11 is an abutment plate 25 which forms a groove to accommodate the ring 15 and which has ports 26, this abutment plate being shown on the left-hand side of this FIG. 2 as being of cranked construction in order to save on overall axial length.

FIG. 2 shows the commencement of operation of the hydraulic pressure abutment while FIG. 1 shows the piston in the midway position, in other words while it is not yet acting on the pressure abutment. The ensuing description of the way the device operates adopts as its premise the illustration in FIG. 2.

In the position shown in the drawing, the lower end face of the adjusting nut 27 bears against the abutment plate 25, thus substantially reducing the throughflow cross-section of the inward movement piston passage 12a to a value corresponding to the ports 26 in the abutment plate 25. Thus there is pressure abutment damping co-operating with the piston valve 12 while upon further inward movement of the piston rod 6 the abutment spring 16 is pretensioned by the abutment plate 25 and ensures that, against the force of the return spring 18 and the valve spring 19, the control member 17, with the valve plate 20, comes to bear on the upper abutment face 22 and so substantially reduces the throughflow cross-section 24 formed by bores in a part connected to the bottom valve unit 5, so that the hydraulic pressure abutment is effective both at the bottom valve unit 5 and also at the piston 7, because the cross-sectional area of the inward movement bottom passage 14a is reduced by the co-operation of the valve plate 20 and the bores 24. When there is a reversal of the direction of the piston rod 6, i.e. when it moves upwardly, it is possible via the valve 13 located in the bottom valve unit 5 for damping fluid to flow out of the compensating space 10 and into the working space 9 through the inward movement bottom passage 13a. Finally, the adjusting nut 27 lifts off the abutment plate 25 and the return spring 18 including the valve spring 19 brings the abutment plate 25, against the frictional force of the ring 15, into its starting position, the valve plate 20 being simultaneously lifted off the bores 24 so establishing the normal damping action of the double-tube vibration damper.

Figure 3:
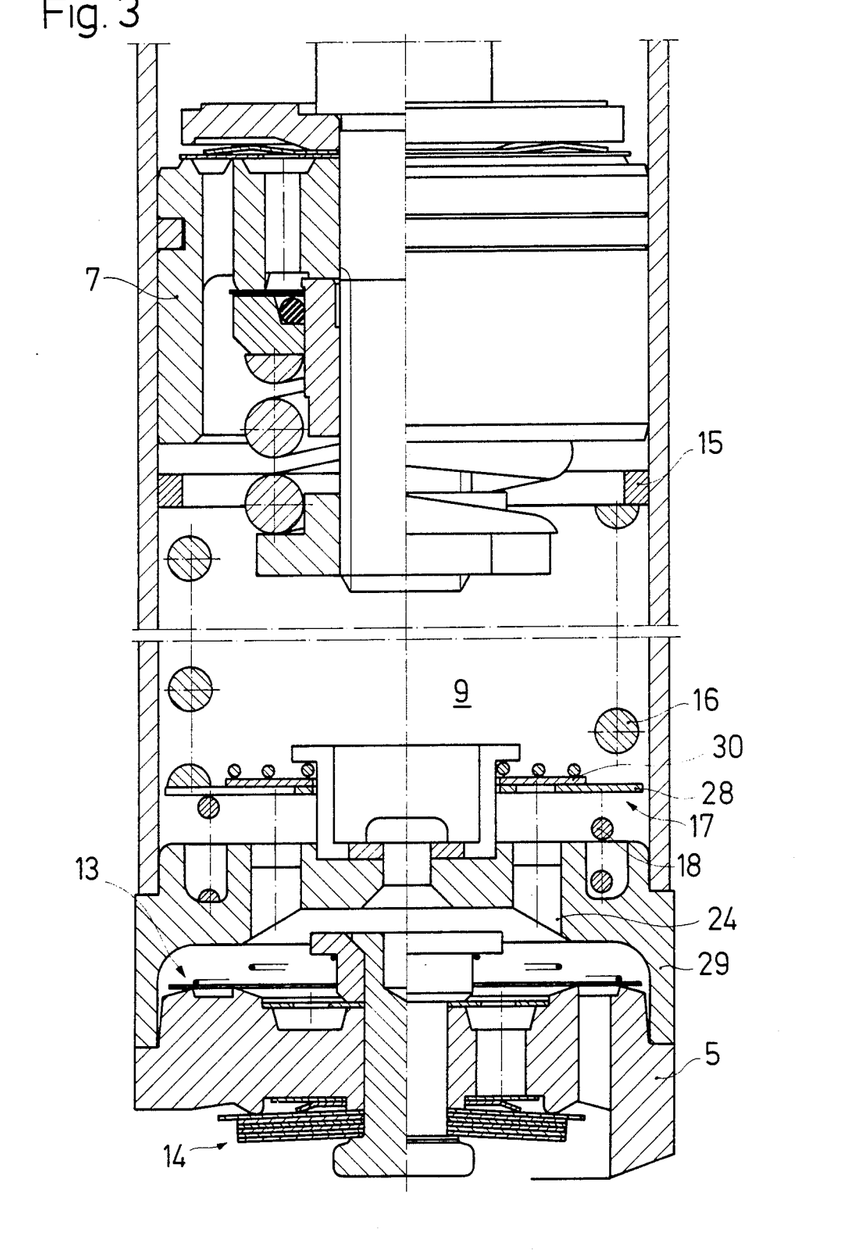
FIG. 3 shows an embodiment of pressure abutment in which a preliminary valve body is associated in series with a basic valve body.

The embodiment shown in FIG. 3 differs from that according to FIG. 2 substantially in that there is upstream of the bottom valve unit 5 a preliminary valve body 29 which comprises the bores 24. Here, the abutment spring 16 acts at one end directly on the ring 15 and at the other on a disc valve 28 which forms the control member 17 and which co-operates with a non-return valve 30. When the pressure abutment becomes effective, the lower and radially outer portion of the piston 7 bears on the ring 15 and pushes this against its frictional resistance downwardly, the return spring 18 being thereby compressed and the disc valve 28 coming to bear on the upper end face of the preliminary valve member 29 and correspondingly reducing the throughflow cross-section of the bores 24. While the piston rod is moving upwards, return flow of damping fluid is guaranteed in that the non-return valve 30 incorporated in series with the valve 13 opens and damping fluid flows out of the compensation volume 10 into the working space 9.

Figure 4:
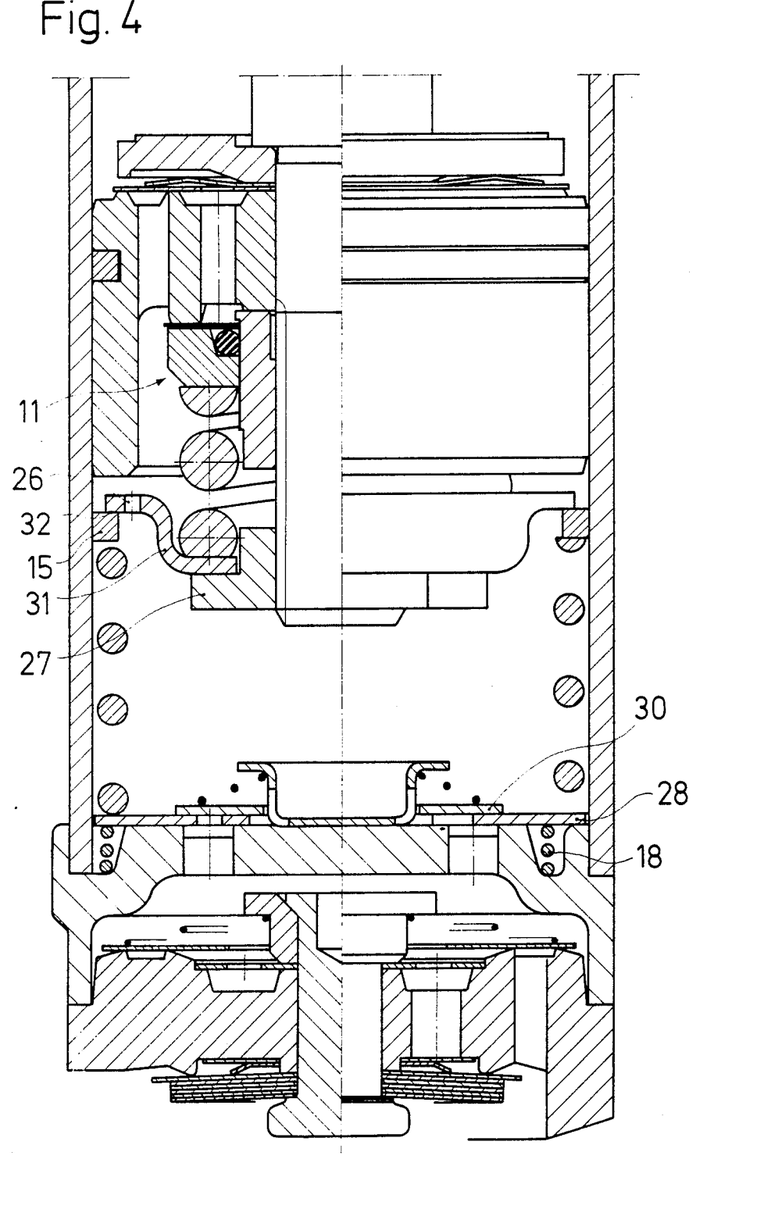
FIG. 4 shows a further embodiment in which an abutment plate is rigidly connected to the piston and the hydraulic pressure abutment is operative.

FIG. 4 shows the pressure abutment in fully operational condition, the difference in comparison with the embodiment shown in FIG. 3 being that an abutment plate 31 provided with ports 26 is clamped rigidly between adjusting nut 27 and the valve spring associated with the valve 11. On its outer periphery, this valve plate 31 forms an annular abutment face 32 which co-operates with the ring 15 guided with friction on the inside wall of the cylinder.

Figure 5:
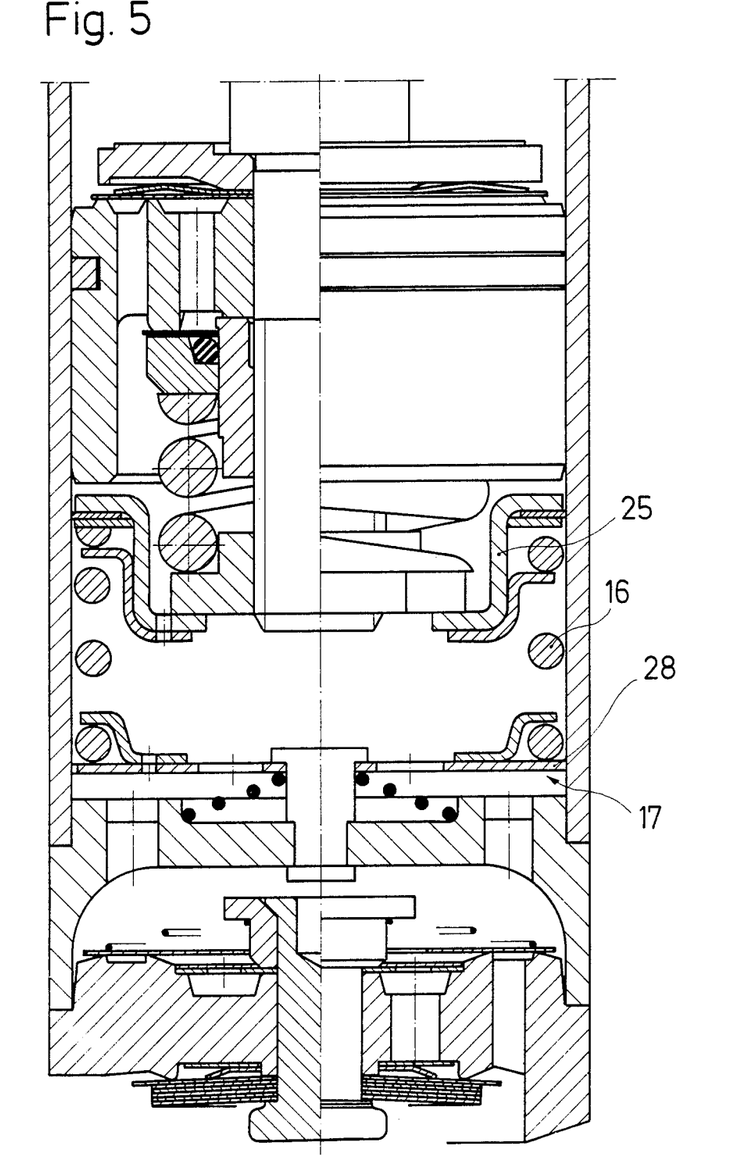
FIG. 5 shows a pressure abutment in which the abutment spring is rigidly connected to the control unit and the abutment plate.

FIG. 5 shows an embodiment in which the abutment spring 16 is connected at one end rigidly to the disc valve 28 of the control member 17 and at the other rigidly to the abutment plate 25.

Figure 6:
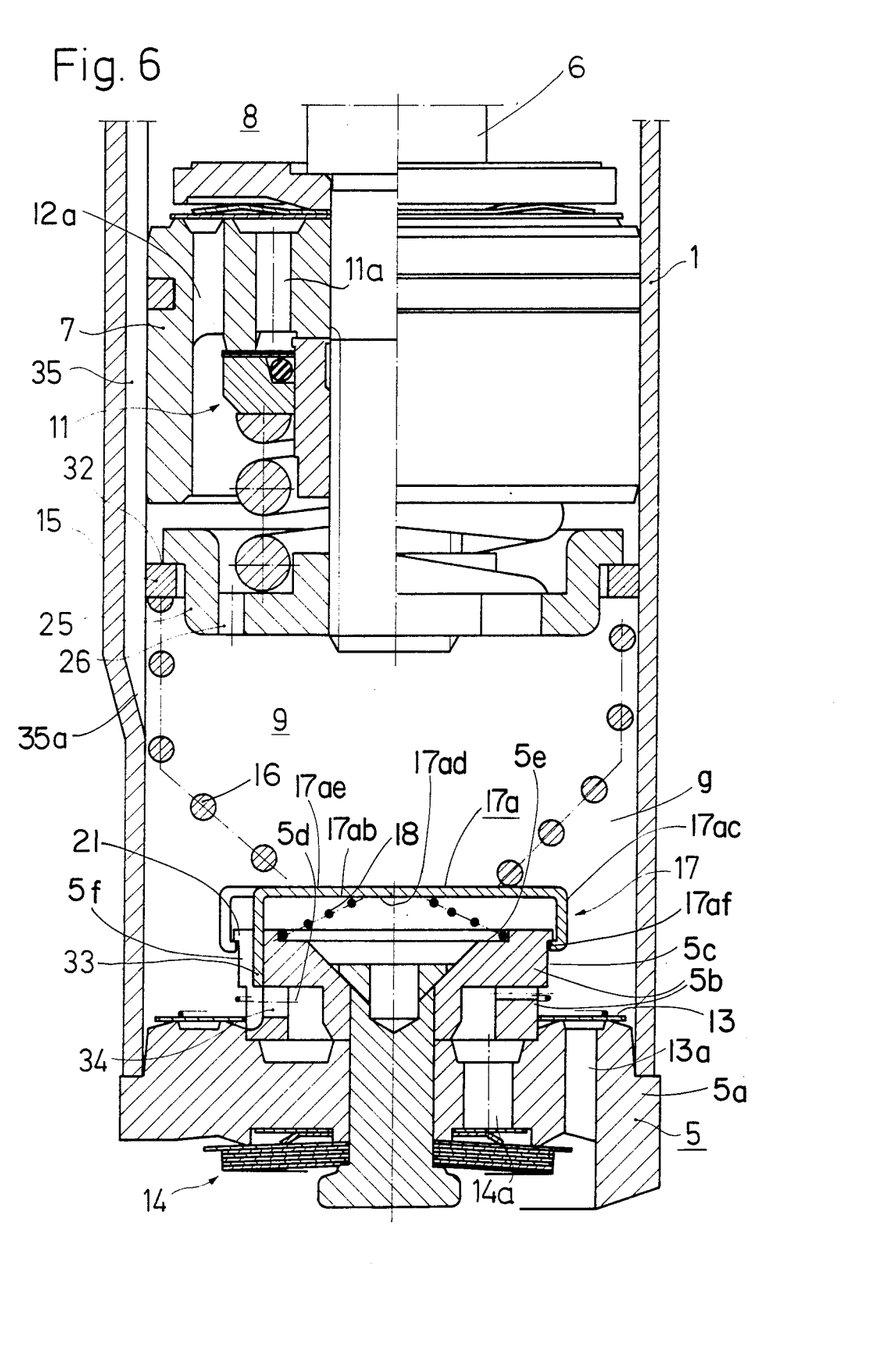
FIG. 6 shows a control unit of the slide-valve type.

A further embodiment is shown in FIG. 6. In this case, the control member 17 is constructed with a slide member 33, the slide member 33 serving to vary the cross-section of the radial bores 34 which are associated with the inward movement bottom passage 14a and the pressure valve 14 of the bottom valve unit 5.

The valve unit 5 comprises a base member 5a, a central block unit 5b having an external circumferential face 5c, a distribution chamber 5d, and an end face 5e. In central block unit 5b there is formed an axially extending groove 5f. At an upper portion of block unit 5b is a rim portion 21 which limits the movement of control member 17 by contacting abutment means 17af. The control member 17 is further made up of a pot shaped control member 17a, a cover wall 17ab having an engaging main face 17ad to contact coil spring 18, a side wall 17ac and a main face 17ae. The abutment plate 25 comprising the throughflow ports 26 in this case forms at the same time the adjusting nut for the valve spring of the damping valve 11 in the piston 7 which is associated with the outward movement piston passage 11a. Furthermore, there is in the cylinder 1 a longitudinal groove 35 which forms a by-pass cross-section between the working spaces 8 and 9. This longitudinal groove 35 is so constructed that the by-pass which is formed by it is still effective when the annular abutment face 32 of the abutment plate 25 is bearing on the ring 15. So at the onset of pressure abutment damping at the bottom valve unit 5, the auxiliary damping means on the piston is still bridged by the longitudinal groove 35. Thus, cavitation in the working space 8 is avoided because at this point in time when pressure abutment damping at the bottom valve is starting, the auxiliary damping means on the piston 7 is still bridged by the longitudinal groove 35. Only after further inwards movement of the piston 7 is the by-pass formed by the groove 35 steplessly closed off and the pressure abutment damping at the piston 7 is added to the already existing pressure abutment damping at the bottom valve unit 5. The groove 35 has an end portion 35a nearer to the second end of the cylinder 1, the cross sectional area of the end portion 35a in subsequent planes perpendicular to the axis of the cylinder being reduced in axial direction towards the second end of the cylinder.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A double-tube vibration damper comprising a cylinder (1) having an axis and two ends, namely a first end and a second end defining a cavity (8, 9) axially between said two end, a container (2) surrounding said cylinder (1) and having a first end and a second end, respectively, adjacent said first end and said second end, respectively, of said cylinder (1), a piston rod guiding and sealing unit (3, 4) adjacent said first ends, a bottom valve unit (5) adjacent said second ends, a compensation volume (10) being defined radially between said cylinder (1) and said container (2), a piston rod member (6) extending through said piston rod guiding and sealing unit (3, 4) and being axially movable inwards and outwards of said cavity (8, 9), a piston unit (7) on said piston rod member (6) within said cavity (8, 9) and separating said cavity (8, 9) into two working chambers (8, 9), a first working chamber (8) adjacent said first ends and a second working chamber (9) adjacent said second ends, said working chambers (8, 9) containing a body of liquid, said compensation volume (10) containing a body of liquid and a body of gas, said piston unit (7) being crossed by piston passage means (12a, 11a) permitting liquid flow between said first working chamber (8) and said second working chamber (9) in response to axial movement of said piston rod member (6), said bottom valve unit (5) comprising bottom passage means (34, 5d, 14a; 13a) permitting liquid flow between said second working chamber (9) and said compensation volume (10) in response to axial movement of said piston rod member (6), an axially movable control unit (17) cooperating with said bottom passage means (34, 5d, 14a; 13a), an abutment spring (16) being acted upon at one of its ends by a component (25) movable with said piston rod member (6) in response to a predetermined path of inward movement of said piston rod member (6) and acting at the other of its ends upon said control unit (17) such as to reduce the cross-sectional area of said bottom passage means (34, 5d, 14a; 13a) in response to said component (25) starting action onto said abutment spring (16), said control unit (17) being axially movable between a first axial position defined by first abutment means (5g, 17af) and increasing the cross-sectional area of said bottom passage means (34, 5d, 14a; 13a), a second axial position defined by second abutment means (17ad, 5b) reducing the cross-sectional area of said bottom passage means (34, 5d, 14a; 13a), said control unit (17) being biased by a return spring means (18) towards said first axial position, said abutment spring (16) acting with said one end onto a friction ring (15) frictionally guided by an inner face of said cylinder (1), said component (25) abuttingly acting in response to said predetermined path of inward movement of said piston rod member (6) onto said friction ring (15), said return spring means (18) having a spring force exceeding the force necessary for axially moving said friction ring (15) with respect to said inner face after the abutting action of said component (25) onto said friction ring (15) is terminated in the course of an outward movement of said piston rod member (6), said control unit (17) comprising at least one slide member (33) with a substantially axially extending slide face, said slide face cooperating with at least one substantially radial bore (34) of said bottom value unit (5), said slide member (33) being axially displaced by said component (25) through said friction ring (15) and said abutment spring (16) with respect to said substantially radial bore (34) in response to said predetermined path of inward movement of said piston rod member (6).

2. A double-tube vibration damper as set forth in claim 1, characterized in that said bottom passage means (34, 5d, 14a; 13a) comprise inward movement bottom passage means (34, 5d, 14a) permitting liquid flow from said second working chamber (9) to said compensation volume (10) in response to inward movement of said piston rod member (6), and outward movement bottom passage means (13a) permitting liquid flow from said compensation volume (10) to said second working chamber (9) in response to outward movement of said piston rod member (6), said control unit (17) cooperating with said inward movement bottom passage means 34, 5d, 14a).

3. A double-tube vibration damper as set forth in claim 1, characterized in that said component is an abutment plate unit (25) which cooperates with said friction ring (15) and said piston rod member (6) such as to reduce the cross-sectional area of said piston passage means (12a, 11a) in response to said piston rod member acting onto said one end of said abutment spring (16).

4. A double-tube vibration damper as set forth in claim 3, characterized in that said piston passage means (12a, 11a) comprise inward movement piston passage means (12a) permitting liquid flow from said second working chamber (9) to said first working chamber (8) in response to inward movement of said piston rod member (6), and outward movement passage means (11a) permitting liquid flow from said first working chamber (8) to said second working chamber (9) in response to outward movement of said piston rod member (6), said abutment plate unit (25) cooperating with said inward movement piston passage means (12a).

5. A double-tube vibration damper as set forth in claim 3, characterized in that said abutment plate unit (25) is provided with port means (26).

6. A double-tube vibration damper as set forth in claim 3, characterized in that said abutment plate unit (25) is fixed to said piston rod member (6) and offers an annular abutment face (32) to said friction ring (15).

7. A double-tube vibration damper as set forth in claim 1, characterized in that said control unit (17) comprises engagement means (17af) engaging behind a collar (21) of said bottom valve unit (5).

8. A double-tube vibration damper as set forth in claim 1, characterized in that said control unit (17) is provided with a non-return valve (13) opening in response to outward movement of said piston rod member (6).

9. A double-tube vibration damper as set forth in claim 1, said bottom valve unit (5) comprising a base member (5a) having substantially axial bores (14a, 13a) therethrough, one group of bores (14a) defining inward movement bottom passage means (34, 5d, 14a), said bottom valve unit (5) further comprising a central block unit (5b) at an end thereof facing the first end of said cylinder (1), said central block unit (5b) projecting towards said first end of the cylinder (1) and having an external circumferential face (5c), said central block unit limiting a liquid distribution chamber connected to said bores (14a) defining said inward movement bottom passage means, said radial bore (34) connecting said second working chamber (9) with said distribution chamber (5d) limited by said central block unit (5d), said distribution chamber being connected by said radial bore (34) with said second working chamber (9), said central block unit (5b) having an end face (5e) facing said first end of said cylinder (1), said control unit (17) comprising a pot-shaped control member having a cover wall (17ab) axially opposite to said end face (5e) of said central block unit (5b) and a side wall (17ac) extending from said cover wall (17ab) towards said base member (5a), said side wall (17ac) being slidingly guided on said external circumferential face (5c) of said central block unit (5b), a portion (33) of said side wall (17ac) cooperating with said substantially radial bore (34), said liquid flowing on inward movement of said piston rod member (6) from said second working chamber (9) in radially inward direction through said substantially radial bore (34) towards said distribution chamber (5d) and in substantially axial direction from said distribution chamber (5d) through said axial bores defining said inward movement bottom passage means, said return spring means (18) being axially compressible spring means located axially between said end face (5e) of said central block unit (5b) and engaging a main face (17ad) of said cover wall (17ab) opposite to said end face (5e) of said central block unit (5b) and said abutment spring (16) acting with said other end thereof upon a further main face (17ae) of said cover wall (17ab) remote from said end face (5e) of said central block unit (5b).

10. A double-tube vibration damper as set forth in claim 9, said external circumferential face (5c) being provided with an axially extending groove (5f), said radial bore (34) opening with a radially outward end thereof into said axially extending groove (5f), said *pot-shaped control member (17a)* being provided with an axially extending tongue (33), said axially extending tongue (33) being slidable within said axially extending groove (5f).

11. A double-tube vibration damper as set forth in claim 9, said central block unit (5b) being provided at the end thereof nearer to said first end of said cylinder (1) with a rim portion (21) extending radially outwards beyond said external circumferential face (5c), said side wall (17ac) being provided at the end thereof remote from said cover wall (17ab) with a radially inwardly directed flange (17af), said radially inwardly directed flange (17af) being engageable with said rim portion (21), said rim portion (21) and said flange (17af) defining said first abutment means.

12. A double-tube vibration damper as set forth in claim 1 or 9, said piston passage means (12a, 11a) comprising inward movement piston passage means (12a) permitting liquid flow from said second working chamber (8) in response to inward movement of said piston rod member (6), said component is an abutment plate unit (25) cooperating with said friction ring (15) such as to effect an additional flow restriction (26) in series with said inward movment piston passage means (12a) in response to said predetermined path of innward movement of said piston rod member (6), and axially extending groove (35) being provided in said inner face of said cylinder (1), said groove (35) by-passing said friction ring (15) and said abutment plate unit (25) when on inward movement of said piston rod member (6) said additional flow restriction (26) becomes effective in response to said predetermined path of inward movement of said piston rod member (6), said groove (35) having an end portion (35a) nearer to said second end of said cylinder (1), the cross-sectional area of said end portion (35a) of said groove (35) in subsequent planes perpendicular to said axis being reduced in axial direction towards said second end of said cylinder (1), said friction ring (15) passing by said end portion (35a) when said piston rod member (6) is further moved inwards after said additional flow restriction (26) has become effective.

13. A double-tube vibration damper as set forth in claim 12, said abutment plate unit (25) being said component and being axially fixed to said piston rod member (6).

14. A double-tube vibration damper as set forth in claim 9, said base member (5) being provided with outward movement bottom passage means (13a) being provided with non-return valve means (13) preventing flow of liquid from said second working chamber (9) to said compensation volume (10).

* * * * *